United States Patent
LeFlohic et al.

(10) Patent No.: US 11,200,603 B2
(45) Date of Patent: Dec. 14, 2021

(54) PLACEMENT AND ADAPTIVE TRANSFER OF ADVERTISING SPOTS IN A BROADCAST NETWORK

(71) Applicant: Jelli, Inc., San Mateo, CA (US)

(72) Inventors: John Paul LeFlohic, San Mateo, CA (US); Torsten Schulz, Palo Alto, CA (US); Trevor Price, Millbrae, CA (US)

(73) Assignee: Jelli, Inc., San Mateo, CA (US)

( * ) Notice: Subject to any disclaimer, the term of this patent is extended or adjusted under 35 U.S.C. 154(b) by 8 days.

(21) Appl. No.: 16/904,958

(22) Filed: Jun. 18, 2020

(65) Prior Publication Data

US 2020/0387938 A1 Dec. 10, 2020

Related U.S. Application Data

(63) Continuation of application No. 14/814,415, filed on Jul. 30, 2015, now Pat. No. 10,733,636.

(60) Provisional application No. 62/147,200, filed on Apr. 14, 2015.

(51) Int. Cl.
*G06Q 30/02* (2012.01)
*H04W 4/06* (2009.01)

(52) U.S. Cl.
CPC ..... *G06Q 30/0276* (2013.01); *G06Q 30/0249* (2013.01); *G06Q 30/0251* (2013.01); *H04W 4/06* (2013.01)

(58) Field of Classification Search
USPC ........................................................ 705/14.1
See application file for complete search history.

(56) References Cited

U.S. PATENT DOCUMENTS

| | | | |
|---|---|---|---|
| 2004/0015400 A1 | 1/2004 | Whymark | |
| 2007/0022005 A1 | 1/2007 | Hanna | |
| 2009/0313120 A1* | 12/2009 | Ketchum | G06Q 30/02 705/14.51 |
| 2012/0166289 A1* | 6/2012 | Gadoury | H04N 21/6437 705/14.66 |

* cited by examiner

*Primary Examiner* — Afaf Osman Bilal Ahmed
(74) *Attorney, Agent, or Firm* — Van Pelt, Yi & James LLP

(57) ABSTRACT

A new RFP specification is received for a new broadcast ad campaign. A placement is determined for a new broadcast ad in a suitable position within an ad network inventory based at least in part on the new RFP specification. A transfer of an existing placement for an existing broadcast ad campaign out of the suitable position to a newer position based at least in part on an existing RFP specification is determined.

20 Claims, 16 Drawing Sheets

| SpotPlan™ \| Plans Proposals Campaigns 🚀Jelli | JP LeFlohic Backend Developer, Jelli |
|---|---|

Plan Creation

BASIC INFORMATION 802

| Ad Network | Jelli Ad Network ⊗ |
|---:|---|
| Agency | Jelli ⊗ |
| Advertiser | Jelli ⊗ |
| Buyer | Sujatha - Thakur (sujatha+ai@jelli.com) ⊗ |
| Salesperson | JP - LeFlohic (jp@jelli.com) ⊗ |
| Plan Name | test plan |

REQUIREMENTS 804

| Nielsen Audio Survey | Fall 2014 ✖ |
|---:|---|
| Audience | Women 18-44 ✖ |
| Population | 56,642,000 |
| Targeting | [Select Targeting] [Content Seperation] |

GOALS 806

| Split Goals ☐ (Goals will appear in respective target tab) | |
|---:|---|
| Cost Per Unit | ⊙ CPP   ○ CPM |
| Reach | ⊙ 1,000.0000   ○ Impressions |
| Budget | Budget |
| Agency Commission | 15.00% |

CONFIGURATIONS

FIG. 8A

CONFIGURATIONS

| amd ⊕ × | pmd ⊕ × | + |

Weeks: 2015-06-29 ✖  2015-07-06 ✖  2015-07-13 ✖
2015-07-20 ✖  2015-07-27 ✖  2015-08-03 ✖  ← 808
2015-08-10 ✖  2015-08-17 ✖  2015-08-24 ✖

Day Part: mo-fr 3p-8p

Spot Duration: ○ 15  ⊙ 30  ○ 60

Advanced: ☑ Consider alternative AQH ratings

MISCELLANEOUS

Notes: Notes

[Cancel] [Submit]

FIG. 8B

Planner Configuration                                                    ✖

Would you like to create:  ⟋ 820

⦿ New revision. This will alter the configuration of a RFP but the resulting plan(s) will not be anchored to the original plan.

○ Anchored revision restricted to original placements. The new plan(s) will be anchored to the original plan and only allowed to use its placements. This is the most restrictive option that guarantees no additive changes to the lineup.

○ Anchored revision restricted to original sites. The new plan(s) will be anchored to the original plan and only allowed to use its sites. This is a restrictive option that keeps the structure of the lineup intact but may choose to increase placements.

○ Anchored revision and allow new sites. The new plan(s) will be anchored to the original plan and use its placement with *preference*. However, the resulting plan(s) may also use new sites if the goals cannot be met with the original sites only.

[Cancel] [OK]

PLACEMENT AND ADAPTIVE TRANSFER OF ADVERTISING SPOTS IN A BROADCAST NETWORK

CROSS REFERENCE TO OTHER APPLICATIONS

This application is a continuation of U.S. patent application Ser. No. 14/814,415 entitled PLACEMENT AND ADAPTIVE TRANSFER OF ADVERTISING SPOTS IN A BROADCAST NETWORK filed Jul. 30, 2015, which claims priority to U.S. Provisional Patent Application No. 62/147,200 entitled PLACEMENT AND ADAPTIVE TRANSFER OF ADVERTISING SPOTS IN A BROADCAST NETWORK filed Apr. 14, 2015, both of which are incorporated herein by reference for all purposes.

BACKGROUND OF THE INVENTION

Broadcast networks such as those in radio and television offer advertising spots to finance operations. The matching of advertising spots to advertisements in a broadcast network differs from the matching in other media, such as online advertising, at least in part because of:
 1. the nature of planning broadcast schedules in advance
 2. the indirect nature of determining demographics and other traits of a listener of the broadcast; and
 3. the one-way, one-to-many, public nature of a broadcast network.

Placement of advertising spots in broadcast networks is currently a complex and manual process that does not necessarily maximize benefit to either advertiser or broadcaster.

BRIEF DESCRIPTION OF THE DRAWINGS

Various embodiments of the invention are disclosed in the following detailed description and the accompanying drawings.

Figure 8D:
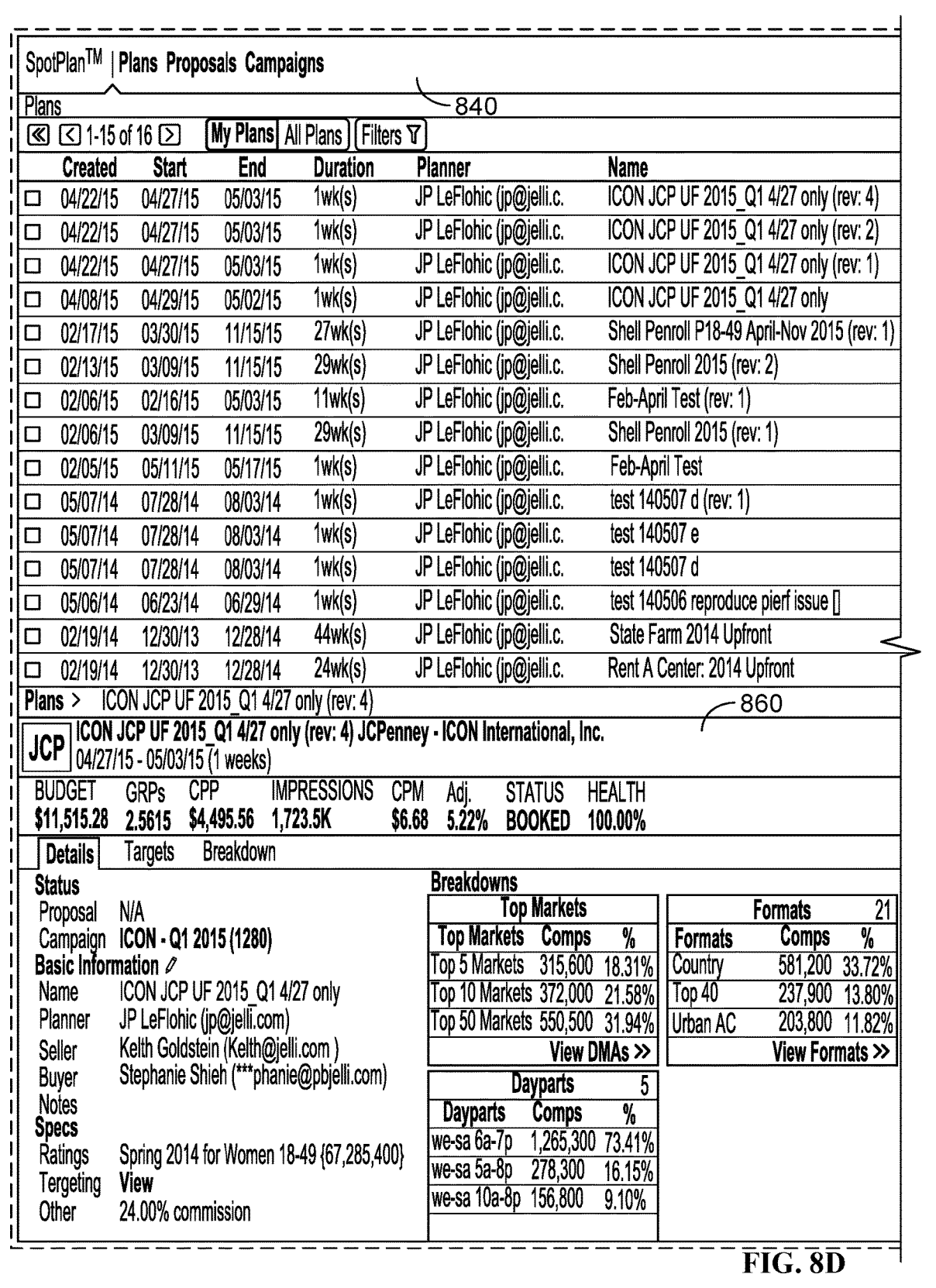

FIGS. 8A, 8B, 8C, and 8D are illustrations of a user interface embodiment to configure an RFP specification.

DETAILED DESCRIPTION

Figure 1:
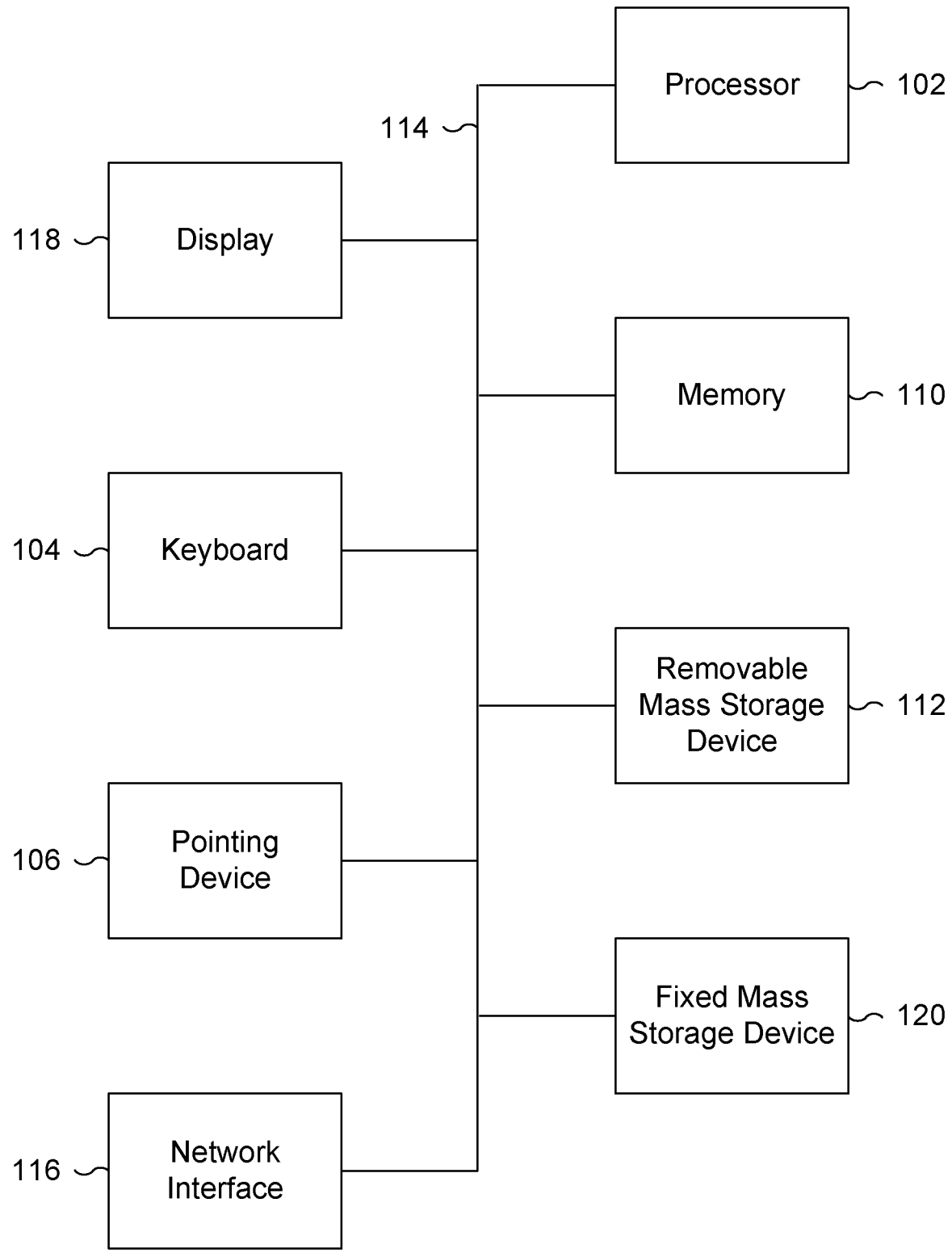
FIG. 1 is a functional diagram illustrating a programmed computer system for broadcast advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

The example of radio is given now, but these principles may be applied for example to television similarly.

FIG. 1 is a functional diagram illustrating a programmed computer system for broadcast advertising in accordance with some embodiments. As shown, FIG. 1 provides a functional diagram of a general purpose computer system programmed to execute broadcast advertising in accordance with some embodiments. As will be apparent, other computer system architectures and configurations can be used to execute broadcast advertising. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
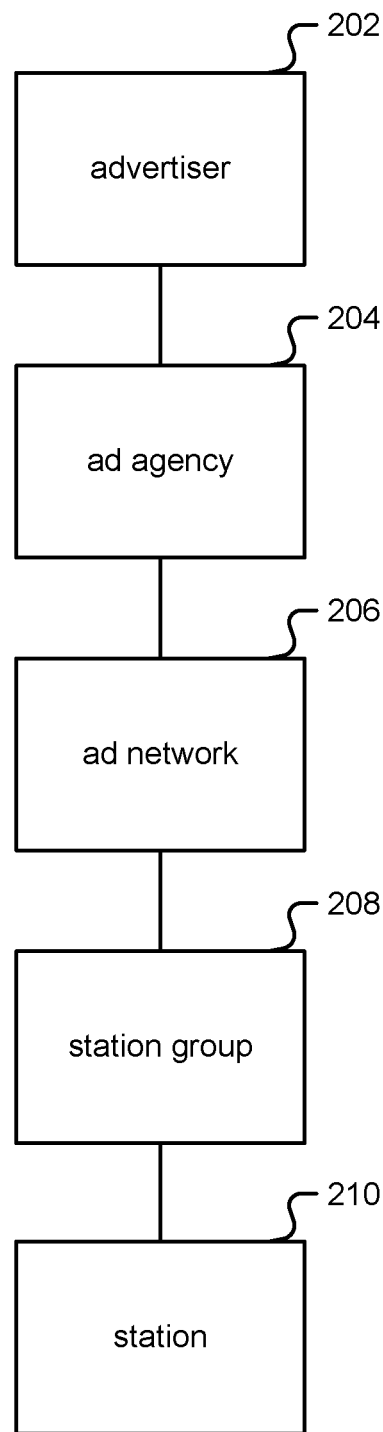
FIG. 2 is a hierarchical diagram illustrating example parties involved in the creative and placement of an ad for broadcast.

Advertising and Broadcast. FIG. 2 is a hierarchical diagram illustrating example parties involved in the creative and placement of an ad for broadcast. A national Advertiser 202 has one or more products, services, and/or messages as advertising on broadcast media. Advertiser 202 retains an ad agency 204 to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/Nielsen via diary or automated listeners, for example by the hour. An RFP may request impressions in terms of Gross Ratings Points ("GRP"s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions.

The ad campaign also comprises one or more ad-creative assets, for example audio creative suitable for a radio ad, video creative suitable for television, and online creative suitable for internet distribution. In some embodiments, advertiser 202 comprises an internal ad agency team 204 within the same corporation.

Ad agency 204 then retains an ad network 206 for publication and/or distribution of the ad campaign. An ad network 206 manages a portion of the placement spots available on multiple broadcast stations 210. Each broadcast station 210 may be independent of the ad network 206 or may be part of the ad network 206. The ad network 206's inventory is the collection of placement spots available on the broadcast media of each broadcast station 210. As will be further elaborated, each spot comprises a position, for example a day of week and/or a daypart (for example, 'AM Drivetime', 'lunch', 'PM Drivetime', or 'evening'). Ad network 206's inventory may be acquired based on direct affiliation with specific broadcast stations 210 and/or may be acquired based on affiliation with station groups 208 comprising multiple broadcast stations 210.

The Ad Network. Radio stations typically have relatively fixed ad breaks, typically twice per hour. A full break might be 5 minutes long, with 4 minutes of advertising. Stations 210 attempt to fill most of each ad break with local advertisers as these tend to pay substantially more to the station 210 than national-product advertising by advertisers 202. However, stations 210 usually do not have enough demand to fully fill the ad-placement spots they have. These ad spots are thus called a station's inventory. The station 210 will thus contract out a portion of their inventory to an ad network 206. The ad network 206 mediates between a large group of stations 208, 210 and national advertisers 202. An ad network 206 may be necessary because the logistical overhead of advertisers 202 interacting directly with stations 210 would be prohibitive for both stations 210 and advertisers 202.

Figure 3:
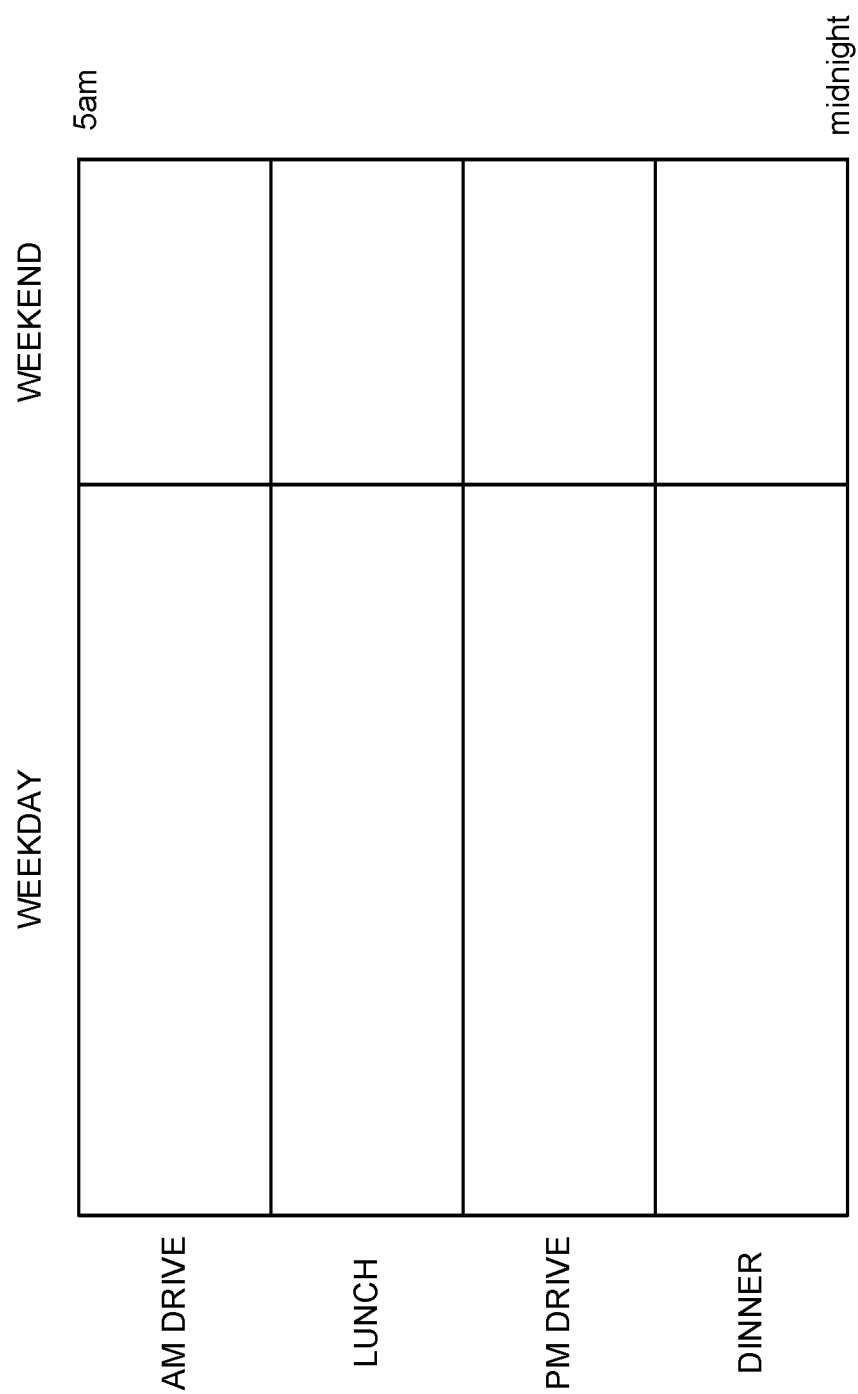
FIG. 3 is an illustration depicting radio broadcast dayparts.

Station Inventory. FIG. 3 is an illustration depicting radio broadcast dayparts. In a radio embodiment, the station 210 typically provides the ad network 206 with inventory for each week. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart", the number of ad breaks it contains and the seconds duration each break is to last.

For example, an inventory might cover the "Monday 5 a-10 a" daypart (referring to 5 am to 10 am on Monday), and contain two 60-second breaks. This would indicate that the station agrees to play one minute of the network's ad content (an "ad break" from the network's perspective) at two points during the daypart Monday 5 a-10 a. However, the station 210 does not explicitly state when they will play the breaks, only that they will not play them too close together, for example within 25 minutes of each other. The coarseness of the contract allows the station 210 to retain some flexibility with where it places its network ads, while still allowing the network 206 to place advertisers' ads into the part of the day they desire.

A Single Campaign. A broadcast network 206 may represent inventory from hundreds or thousands of stations 210. When an advertiser 202 approaches them about running an ad campaign, the advertiser 202 may specify directly or indirectly what demographic, for example Women 18-45, and daypart they would like to play in and how many impressions they would like to get. The advertiser may specify a wide daypart such as Monday-Friday 5 a-10 a; that is, a daypart does not need to be on a single day. The daypart can also be complex, specifying several parts of the week: "Monday-Friday 5 a-10 a; Monday-Friday 3 p-8 p". The network 206 then determines how large a campaign they can sell the advertiser 202 and presents the plan to them as a proposal. If the advertiser approves, the plan becomes booked.

In one embodiment, a campaign plan moves between four business-process states: saved, proposed, reserved, and booked:

Saved—When the ad network 206 has formed a plan but has not yet presented it to an advertiser 202 for their approval, the plan is "saved". Because a saved plan has not been externally published yet, the network 206 is typically free to alter it as much as they want.

Proposed—Once the ad network 206 presents a plan to an advertiser 202 for their approval, the plan is "proposed". Proposing the plan means that the network 206 gives up much of its flexibility to alter the plan going forward. However, as the plan has not yet been committed to by the advertiser 202, the network 206 does not reserve the inventory the plan uses.

Reserved—Often times, the network 206 has reason to be confident that an advertiser 202 is likely to approve a plan, or at least, a plan very similar to it. In that case, the network 206 can go ahead and reserve the inventory while they wait for approval to be sure that no other plans end up taking those inventory spots.

Booked—Once the advertiser 202 has committed to a plan, it is booked, which means that the plan, in addition to reserving certain spots, is approved to actually play as well.

Typically, when a broadcast station 210 fills up their advertising spots with ad-campaign placements, they quickly run out of space and may not fit additional campaigns into the fragmented bits of inventory remaining. The fragmented bits that remain may not be used because each advertiser 202 prefers to have their campaign to play a substantial amount within specific dayparts. This station 210 level fragmentation loss affects the stations' 210 overall inventory, not just the inventory they have given to ad networks 206, and constitutes one major source of lost value.

By analogy, imagine that a restaurant only received parties of ten to twenty people. Additionally, each party was specific about which parts of the restaurant they were willing to sit in. After a few large parties are seated, the remaining seats will be a patchwork that may not fit any additional parties.

The situation may be worsened for the ad network 206, which represents hundreds to thousands of stations 210. The ad network 206 may attempt to solve an analogous fragmentation puzzle involving the inventory slices from each of its affiliated stations 210. The ad network 206's inventory thus is often 20% to 30% unsold simply because the inventory has been fragmented into an incoherent jumble. When inventory goes unsold, the broadcast media is filled with lower performing filler such as non-profit and/or government messages that do not contribute substantively towards the station 210, station group 208, and/or network 206.

Currently, ad distribution and delivery in the broadcast industry is "pen and paper" or manually performed, due at least in part to an entrenched history of how it has been done, and due to the high heterogeneity of broadcast stations throughout a country. The technologies, process, culture, and business concerns of stations may vary dramatically, necessitating a lowest-common-denominator approach where hundreds of people at the ad network 206 directly interact, via phone or email, with several people at each of the hundreds or thousands of stations 210 that are in the network.

Typically, there is also little to no feedback loop on how well things were actually delivered. As a practical measure, agencies 206 and stations 208, 210 have a "don't ask, don't tell" policy when it comes to delivery problems, despite there being perhaps 20% to 30% under-delivery due to various problems. Examples of delivery problems are the the wrong ad played, played at wrong time, or played next to a competitor's ad, or the ad was not played, played too poorly, or played when the broadcasting tower was broken, and so on.

With the complexity of matchmaking exceeding the practical limits of a manual pen-and-paper method, networks 206 typically cope by requiring that advertisers 202 buy a homogenized slice, called a "network minute", across all the stations 210 in their network 206. In this way, the inventory does not get broken up and things do not get complicated. While this does reduce complexity, it adds inefficiency. The advertiser 202 gets little say in who they target (for example, which stations 210) or when they play (for example, which daypart). Thus, using network minute delivery is completely unoptimized to what the advertiser 202 really wants. As a result, the delivery is correspondingly less valuable to advertiser 202. This in turn lowers advertiser 202 demand, which may lead to waste inventory the network 206 again may not fully sell their inventory. Note that this potential loss due to unsold inventory is a loss in addition to poor matchup due to network-minute selling. That is, because there is no attempt to match the inventory to the detailed desires of the advertiser 202, the total value delivered by the inventory is substantially less than what it could be.

Typically, there are further complications. For example, ads that are placed in the same break may be compatible with each other. For example, two soft drink products may not be in the same break. Some advertisers 202 do not want to share a break with what they consider to be a controversial product. Finally, some advertisers 202 do not want to be placed in what they consider to be controversial stations.

Typically, ad campaigns that only last a week are rare. Usually they last for several weeks and end up competing for space used by other campaigns, which themselves may extend into a different set of weeks, stations, and dayparts.

Over the course of many months leading up to a particular week, the network 206 progressively learns about each campaign that would like to include that week in their plans. For each potential campaign, they may first form a proposed campaign plan to present to the advertiser 202. Typically, it may be many weeks before the advertiser 202 commits to the plan. Advertisers 202 often wait to commit until just a week or two before the go-live time, when the week in question starts.

A common issue is answering what the network 206 does with the inventory spots they assigned to the proposed campaign plan before the advertiser 202 commits. If the station 210 reserves that inventory for the advertiser 202, then they may not assign it to other campaigns. Acceptance rates are often as low as 30%, and that means opportunities may be missed. If the network 206 does not reserve a proposed plan's inventory, then other campaigns can be accommodated more flexibly. However, conflicts may occur if two plans eventually try to reserve/book some of the same inventory spots. In fact, if the network 206 does not reserve the inventory, then it is almost guaranteed that by the time the advertiser 202 commits, the network 206 will have to present a slightly revised plan to the advertiser 202 since some of the original plan will be "damaged" by other plans from other advertisers.

Traditional Methods. The need to allocate ad plays into a 210 station's inventory spots has been around almost as long as radio has. As mentioned earlier, even today this is almost always done "by hand"/manually, with a highly experienced person determining with pen-and-paper/simple spreadsheets where they can place allocations for a new campaign. A problem is that each campaign has specific and differing placement and sizing requirements from the next campaign. The result is that the campaigns form a patchwork on the 210 stations' inventory that breaks up the inventory into unusable remnants. As mentioned before, in some cases this can lead to 20% to 30% of a 210 station's inventory going unfilled by paying advertisers 202 each week.

Broadcast vs Online Media. Generic scheduling/allocation systems or ad-delivery processes used in mediums other than broadcast are not the same as the broadcast inventory-fill problem. There are several unique characteristics of the broadcast ad distribution problem. In online media (for example browser/websites and/or phone apps), ads are directed at individual people with known demographics. By contrast in broadcast, an ad reaches thousands of people simultaneously (usually publically), creating a demographic pattern of impressions. In online media, the upcoming amount of impressions is not guaranteed because one may not be certain of how many people of each demographic will visit a website or smart-phone app. By contrast in broadcast, the number of impressions is effectively guaranteed because the industry has settled on official estimates of listenership based off of sampling polls.

Automated and Feedback Solution. Taking a high-level description of a desired campaign, the network's inventory and existing reserved campaigns, and algorithmically creating a fully customized/optimized proposal plan is disclosed. In one embodiment, the plan simultaneously optimizes the constraints and desires of the stations 210, the ad network 206, and the advertisers 202, and where necessary, it compromises in a balanced way.

Figure 4A:
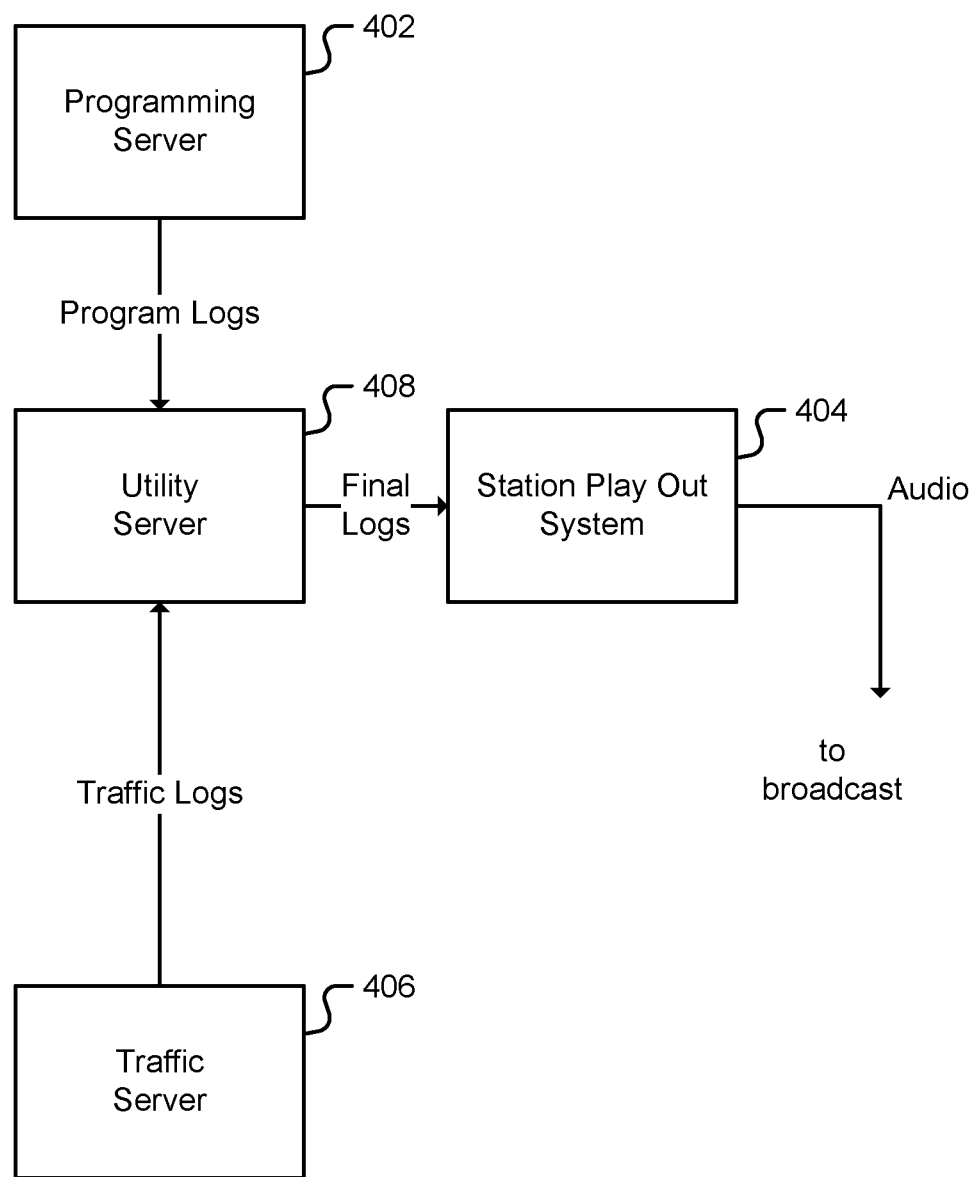
FIG. 4A is a block diagram illustrating a traditional broadcast system.

Sidecar Appliance. FIG. 4A is a block diagram illustrating a traditional broadcast system. The system of FIG. 4A may be at a station 210. In the example shown, 402 is a programming server. Throughout this specification, "programming" refers to core content of the broadcast station, usually content that is more valuable for broadcast consumers, for example listeners or viewers of the broadcast. Throughout this specification, "server" refers without loss of generality to either an internal or external system/platform and may be implemented in software and/or hardware. Thus, a utility server 408 and station play out system 404 may be housed within a single computer as shown in FIG. 1.

A programming server typically has access to pre-recorded or live programming content to be interleaved with traffic and/or ad content. Programming server 402 is coupled with a utility server 408 via program logs, which are generally human-readable files, for example text files, that indicate log book and/or timing details for "carts", which are cartridges and/or unique identifiers for specific creative pieces, including programming, commercials, weather, news, top-of-the-hour announcements, and other programming. For example cart COM-2537 may be a 30-second advertisement for a national home-improvement store with a 10% promotion. Program logs contain information on carts like PRO-1024 which may be a Top 40 popular song that happens to take three minutes and fifty-one seconds. The program logs may also store information for disc jockeys (DJs) such as artist, title, track, rotation, and trivia information about the cart.

Similarly, traffic server 406 provides traffic content. Throughout this specification "traffic" content refers to content other than programming, for example traffic reports, weather reports, local news, FCC mandated spots, such as top-of-the-hour, and local/network/national ad spots. Traffic server 406 is coupled to utility server 408 via traffic logs. Traffic logs contain information on carts like the example of COM-2537 above, or WEA-1100 which may have the eleven o'clock weather report for forty-five seconds.

Utility server 408 provides a merge and/or continuity function to form final logs that are the program logs from programming server 402 and traffic logs from traffic server 406 merged for final play out. The final logs are submitted to station play out system 404, also known as a primary play out system, or an automation system. Without loss of generality, the automation system may include both utility server 408 and play out system 404. The play out system has an audio codec and the capability to directly push content to broadcast.

Typically logs, based on schedulers' log books, are generated a day prior to a broadcast airing and have a predetermined schedule of triggering traffic via the play out systems 404 and 408. This is an issue in that logs are static by being generated so early, and that audio copy may not be changed in real time.

Figure 4B:
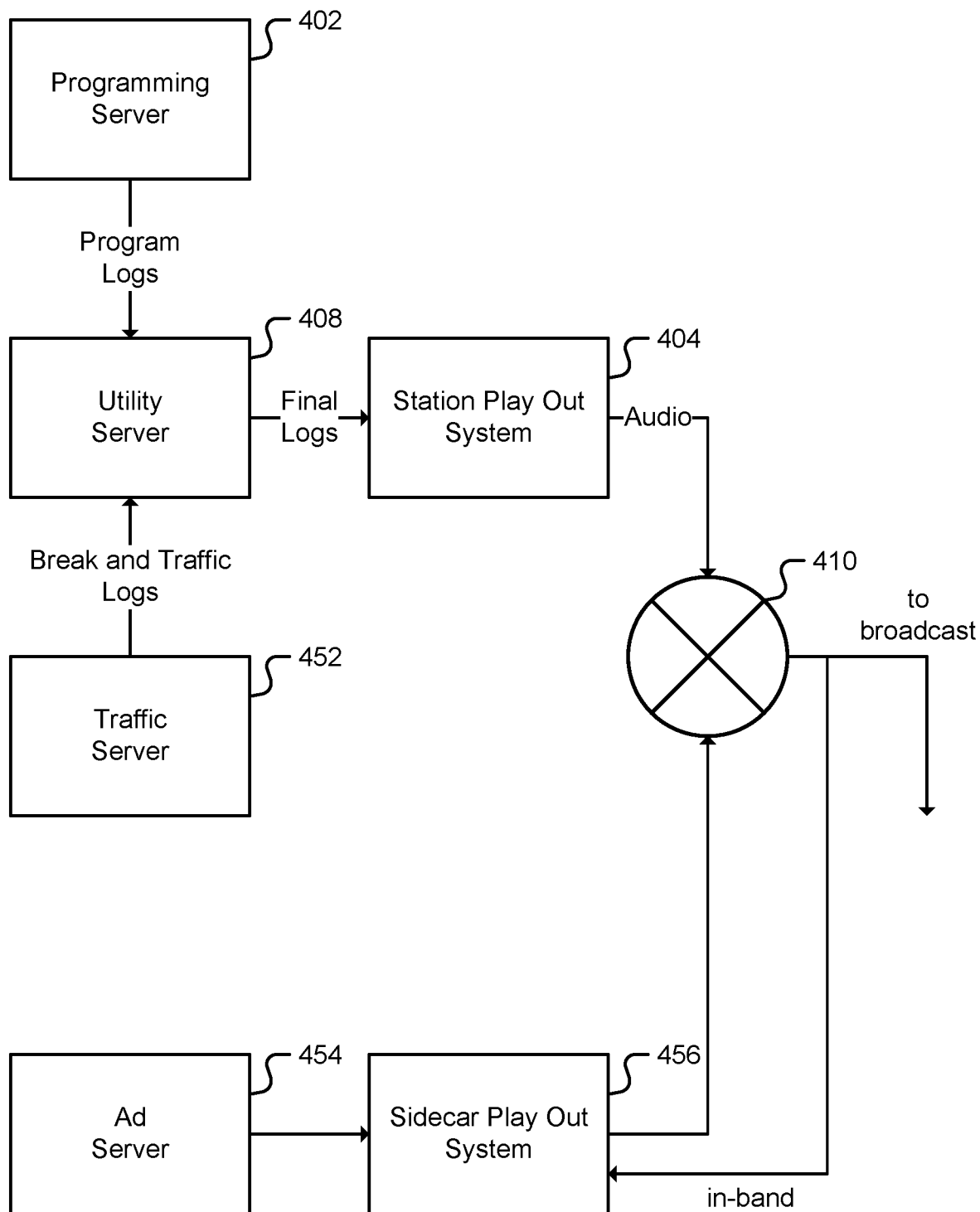
FIG. 4B is a block diagram illustrating an example of a sidecar-appliance broadcast system.

FIG. 4B is a block diagram illustrating an example of a sidecar-appliance broadcast system. The system of FIG. 4B may be at a station 210 affiliated with ad network 206. The sidecar appliance permits ad network 206 to trigger and play spots at station 210 in real time. In the example shown, similar to FIG. 4A, programming server 402 is coupled with station play out system 404 via utility server 408 which is coupled with mixer 410. One traffic server 452 providing, for example, commercial breaks, traffic, and weather reports, is also coupled with station play out system 404 via utility server 408 to provide some but not all of the traffic content for broadcast, and it leaves room for another traffic server using "break" logs. Another traffic server, also known as an ad server 454, is coupled with another second play out system 456. In one embodiment, the ad server 454 is a cloud based platform, wherein cloud refers to cloud computing. Cloud computing refers without loss of generality to the practice of using one or more remote servers hosted on a computer network, for example the Internet, rather than only using local servers and/or local personal computers. Although traffic server 454 is depicted as an ad server, without loss of generality the same in-band trigger techniques may be used for non-advertising content. Because sidecar play out system 456 has its own audio codec, and ad server 454 may be cloud computing based including associated with the internet, it provides a way for media creative to be loaded and scheduled in real time to be merged with the day-old programming logs of a traditional broadcast.

Furthermore, because sidecar play out system 456 can listen to in-band program audio, it can provide real time compliance data to a cloud platform, for example ad server 454. This allows an advertiser 202 or ad agency 204, to verify a creative spot was played in full, what time it was played, when it was played in the logs (for example what program was played prior to the creative spot being played), and the frequency it was played. Sidecar play out system 456 does not need to have an auxiliary network for triggering but may rather directly monitor the output of mixer 410, in-band. When sidecar play out system 456 detects and decodes an in-band trigger, it directly plays content based on instructions and audio copy from ad scheduling server 454 to mixer 410 and out to broadcast.

Improving on the manual process with the sidecar appliance. Thus in one embodiment, a real-time media-delivery sidecar appliance 456 is installed in over a hundred broadcast stations 210. Each broadcast station 210 may then be affiliated with one or more ad networks 206. This allows delivery of a selected ad to the right spot directly into the radio/television broadcast station's broadcast stream at nearly any desired time. Thus, serving ads from the appliance computer permits a near immediate reactiveness to desired changes in ad campaigns. This level of reactiveness is not at all practical in the "by hand"/manual approach.

That is, even if a network had an army of people transferring existing placements to attempt to fully fill their network, the complexity would boggle the army of people. The constant stream of ad-placement changes would have to be communicated to independent people at hundreds or thousands of radio stations; and not only would these people reject the idea of constantly making adjusts, they would not be able to do so reliably. This hypothetical situation is further exacerbated by the fact that a week's inventory is at its worst gridlock just before the week's go-live time.

Thus, the sidecar appliance 456 allows a fresh solution for the inventory-fill problem at a detailed level that only an automated system/computer can handle, rather than with the traditional broad-stroked methods that a person or persons can realistically apply manually. By computerizing the process, a new tool is forged to avoid running out of space by transferring the existing campaigns' spot placements in a systemic way that concurrently explores all options and pick the best one. The capacity for network-wide transfers and properly using that capacity is thus a new problem space for broadcast inventory-fill.

No need to reserve plans ahead of time. In one embodiment, the network does not need to reserve the proposed plan ahead of time because a plan can automatically be adjusted into an equivalent form even after it has been committed to. This is made possible because the high-level description is stored along with the resulting plan. For each plan, it is determined ahead of time what the 202 advertiser's level of flexibility is. For example, an advertiser 202 might only be concerned with how many impressions they get in each week and market. This allows the process to automatically move ad placements within each market-week as needed as long as the resulting impressions are equal to or greater than what was agreed upon.

Within a market, a placement in each station 210 and daypart yields varying numbers of impressions to the overall campaign. A placement is not simply moved from one station to another. For example, it may be necessary to create multiple placements on a smaller station to replace one placement from a larger station. Each placement is not processed in isolation however: the overall balance of impressions is tracked and compared with the original plan to decide how many placements, if any, to create or remove during a transfer.

Figure 5A:
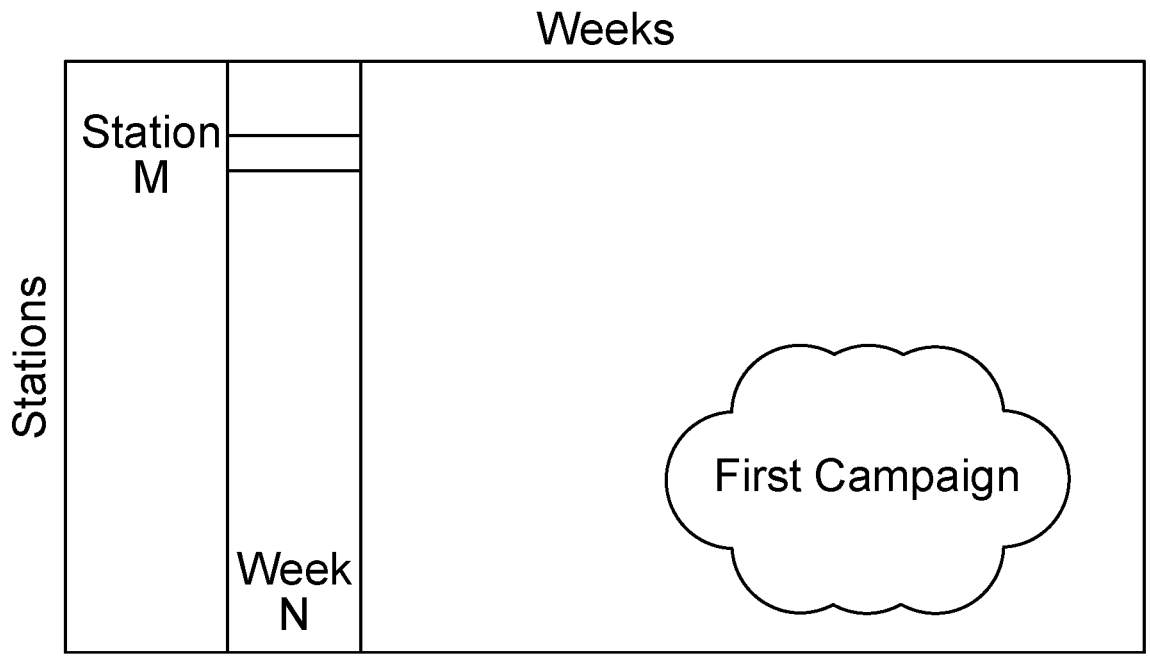
FIGS. 5A and 5B illustrate the preemption problem.
Figure 5B:
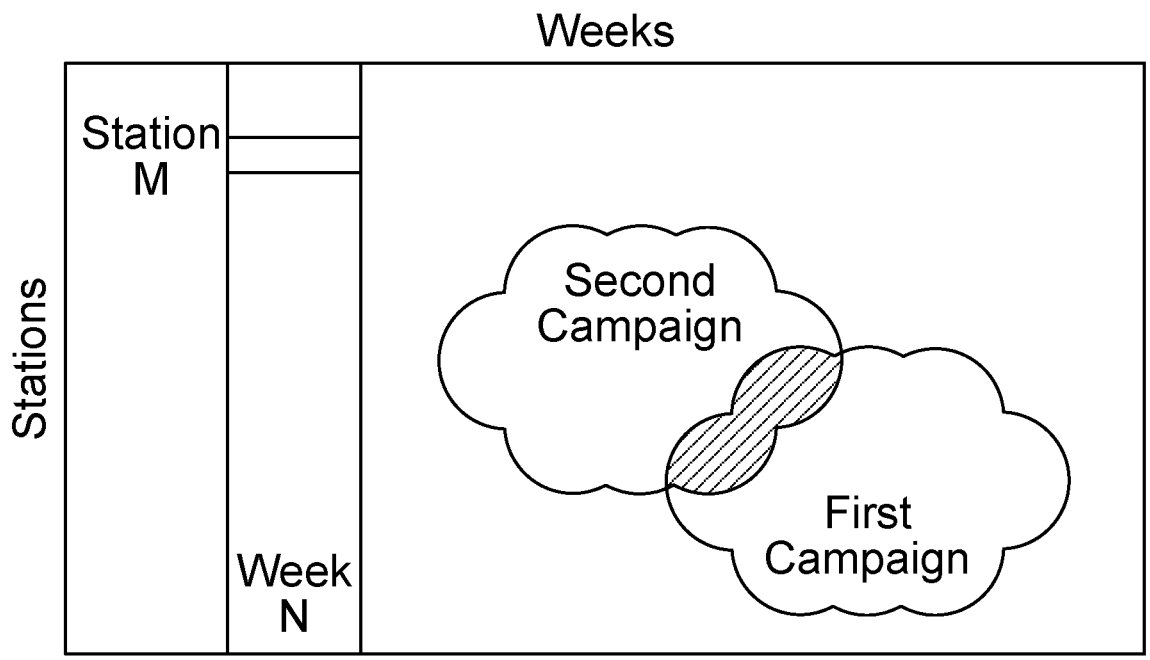

Solving the Preemption Problem. FIGS. 5A and 5B illustrate the preemption problem. The preemption problem is the problem of campaigns arriving in an inopportune order. In FIG. 5A, a first campaign is depicted graphically with the horizontal axis ranging over weeks of spots and the vertical axis ranging over stations 210 in network 206. Thus a vertical band shows week "N" for all stations, and a horizontal band may show spots for station "M", and a cell may depict spots for station "M" for week "N". A first campaign is depicted as a cloud shape over multiple weeks and stations.

In FIG. 5B, a second campaign arrives. If planned naturally, this second campaign would use some of the inventory spots that have already been allocated to the first campaign. A shaded area shared between the first and second campaign shows the collision. To allow the second campaign to be planned into the inventory that is most optimal for it, some or all of the conflicting allocations from the first campaign can be transferred to compatible inventory spots. That is, transfers reorganize and clear up space for new campaigns as needed. Ad placements of existing campaigns are only transferred within the confines of the agreed-upon high-level campaign specifications. When considering whether to transfer a particular placement and where to transfer it to, the process measures the net increase or decrease of impressions in the overall system and picks the best strategy accordingly. Normally, if there are no further places to transfers existing allocations to, the process may be forced to simply limit the size of the new campaign in that area. However, if the new campaign has been assigned higher priority than the first, the process is allowed to simply remove allocations of the first campaign to make space. This is termed "preemption", after an analogous process in operating-systems theory. Preemption may only be used in the appropriate business circumstances. In particular, the preempted campaign may be sold with the caveat of non-guaranteed delivery.

As will be shown, with an adaptive transfer algorithm, networks may be more free to commit to campaigns as they come in because the process automatically adjusts existing campaigns to make space for new ones. The process reactively adjusts where each campaign is delivered to optimize how efficiently the inventory is used overall.

By assuring that each placement addition or transfer made is optimal according to all the metrics considered, the technique assures that, overall, the network's inventory and plans remain optimized according to those same metrics. That is, the process may be designed to have a convex "problem space", and small-scale changes are made such that the optimality of the overall system is maintained.

Figure 6:
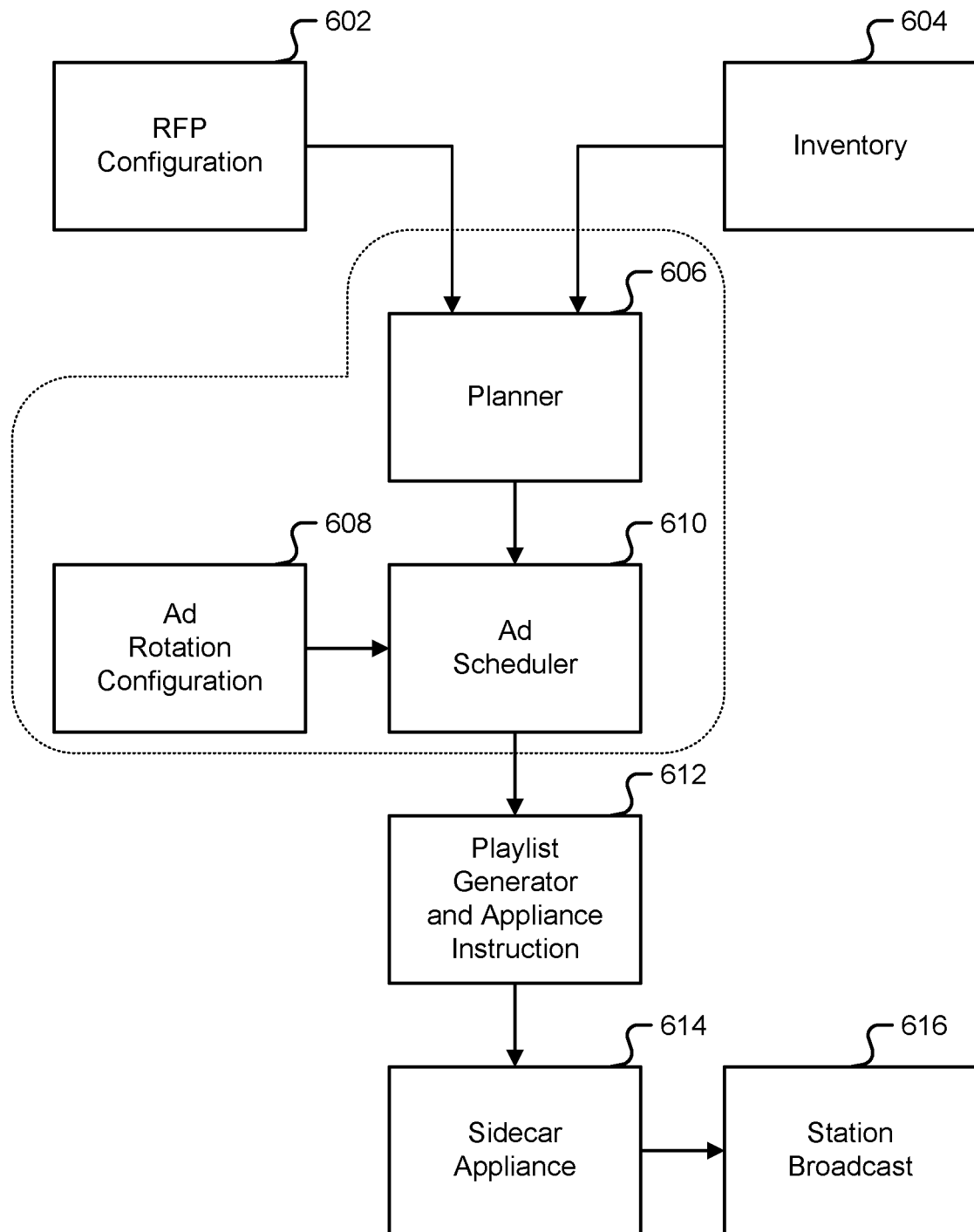
FIG. 6 is a system diagram illustrating an embodiment for planning broadcast ads.

System for planning broadcast ads. FIG. 6 is a system diagram illustrating an embodiment for planning broadcast ads. An RFP configuration system 602 permits an advertiser 202 and/or ad agency 204 to interface and develop an RFP specification for receipt by the planner system 606. The inventory configuration system 604 may allow the ad network 206 to enter recurrence-rule based inventory contracts or customized individual inventories. Combined these may form the ad network 206's network-wide inventory.

Once inventory has been entered and a new RFP configuration 602 is entered, the planner system 606 then executes several cooperating algorithms to determine the placements for the new RFP as well as the needed transfers of pre-existing placements from earlier RFPs, if any. The result of the planner system 606 may be a plan for the RFP configuration 602.

The plan indicates which inventory spots may be used by the RFP 602, but it may not yet specify exactly which ad will play in each spot. The plan is kept abstract in this way because, typically, advertisers 202 will not give their final set of ads till just a few days in advance. Moreover, they may alter the ads as they see fit, mid-flight of their campaign. In addition to eventually providing the ads, the advertiser 202 may use the ad-rotation configuration system 608 to indicate which set of ads to play in each region and how much weighting may be given to each ad. The task of the ad scheduler 610 is to take the generic RFP-level plan and the ad-rotation configuration 608 and create ad-based scheduling. Within each ad-rotation configuration 608, the set of ads is properly rotated and weighted using the tiling algorithm. Tiling will be explained in further detail below. A dotted line is shown around planner system 606, ad rotation configuration system 608 and ad scheduler 610 to indicate in some embodiments that the systems may be performed by one or more computers/servers as described in FIG. 1.

The resultant ad schedule from ad scheduler 610 is sent to the playlist generator and/or appliance instructor system 612. The appliance instructions are transmitted via computer network to the sidecar appliance 614 (also shown in FIG. 4 as system 456) where they are stored. The appliance 614 may then operate independently for several weeks, if needed. The station 616 may call the appliance 614 when it is time to inject an ad break into the output stream. Based on the precise time of the call, the appliance 614 consults the instructions to determine the break to play and emits it into the station broadcast system 616.

Figure 7:
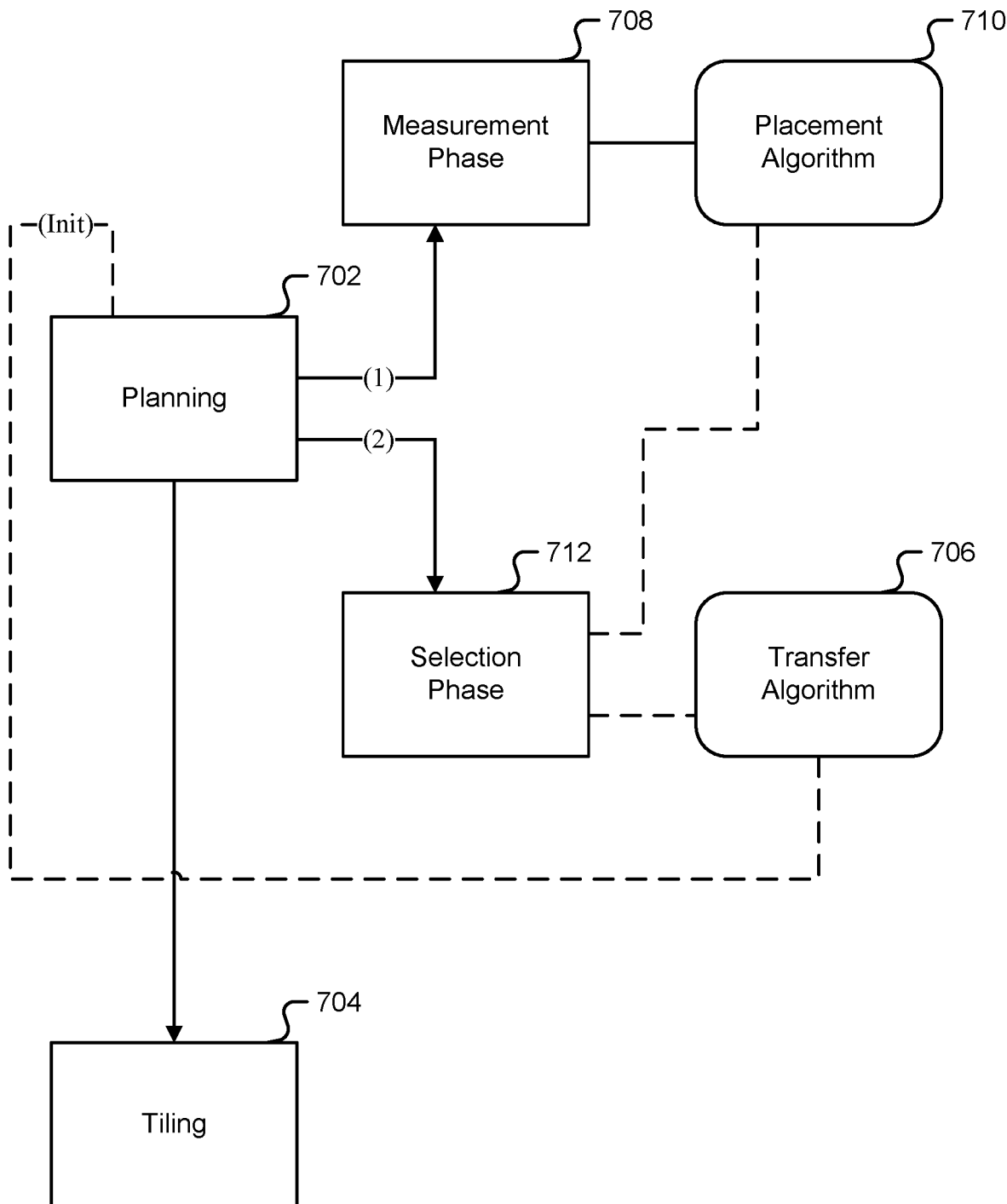
FIG. 7 is a flow chart illustrating an embodiment for planning broadcast ads.
Figure 8D:

Flow for planning broadcast ads. FIG. 7 is a flow chart illustrating an embodiment for planning broadcast ads. In one embodiment the steps in FIG. 7 may be performed by systems in FIG. 6 including one or more of the following: the planner system 606, ad rotation configuration system 608 and ad scheduler 610. Algorithms, subroutines and/or reused code are shown with rounded corners in FIG. 7, while steps are shown with straight corners.

The flow chart in FIG. 7 shows that planning 702 is engaged when a new or changed RFP specification is submitted via the RFP-configuration system 602. Alterations to inventory via the inventory-configuration system 604 may also trigger a variant of the planner, termed the "healer", which attempts to repair damage done to existing plans as a result of the inventory changes.

Broadly two steps are engaged. The first step 702 is planning which inventory spots to allocate to an RFP. Planning a particular RFP is accomplished forming a plan one placement at a time. For each placement, a measurement phase 708 is first performed, where all allowable inventory spots are measured for fitness according to the various logical and numerical metrics of the placement algorithm 710. For example, an inventory may have high fitness for the RFP if a high percentage of its listenership matches the demographic that was requested by the RFP. Once the measurement phase 708 completes, a selection phase 712 picks the most fit inventory spot and allocates it to the plan. For sake of efficiency, the selection phase 712 may pick several of the most fit spots at once so that fewer measurement phases 708 will be required. As mentioned earlier, often an inventory spot is available only if one or more pre-existing placements are transferred out of the way first. The transfer algorithm 706 finds and executes the best transfer strategy to open up space as needed by the selection phase 712. The overall plan is formed by repeated measurement 708 and selection 712 phases until the goals of the RFP are met or the system runs out of appropriate inventory spots. While the tiling algorithm is not part of the planning process per se, it is included in FIG. 7 to point out that the plan resulting from planning 702 will eventually be further processed by the tiling algorithm within the ad scheduler 610.

Planning is initialized, step 702, by determining which inventories still have spots open that will accommodate the plan. Note that the fitness/attractiveness of each inventory to the plan is a separate issue from whether an inventory has the space to physically accommodate a placement of the plan. Even if an inventory does not directly have an open spot, the transfer algorithm 706 is used to check for whether an opening can be hypothetically created via a sequence of transfers. If an inventory has no open spots, directly or via transfers, the piece of inventory is removed from the list of active inventories. It is only the list of active inventories that will be measured during the measurement phase 708 for the remainder of planning. After the list of active inventories is initialized, in one embodiment it is maintained in an efficient O(1) way since it is only needed to re-check an inventory each time a placement is put into it. As well, an inventory may be double checked that it still has space just before a new allocation is put into it. This is done since the transfer strategy that previously gave the inventory "space" may have been used up already by some other inventory earlier in the planning. In any case, if an inventory runs out of space during planning, it is removed from the active inventories list, which speeds the remainder of planning 702.

During each measurement phase, there are various reasons that an inventory may be temporarily excluded from selection. In particular, the RFP configuration 602 may specify an inventory-per-cost rate limit. During planning 702, if the plan formed so far is just below this limit, and picking an expensive piece of inventory would push the plan over the limit, then the inventory is temporarily unselectable. However, the expensive inventory is kept in the active list since may be selectable against later after some cheaper inventory has been picked.

FIGS. 8A, 8B, 8C, and 8D are illustrations of a user interface embodiment to configure an RFP specification. The illustrations in FIGS. 8A, 8B, 8C, and 8D may be a sample interface for RFP configuration system 602 in FIG. 6.

Basic Information User interface ("UI") element 802 allows the advertiser 202 and/or ad agency 204 to identify the players including advertiser 202, ad agency 204, ad network 206, and identify the RFP.

Requirements UI element 804 details demographic requirements and market requirements for the RFP specification plan. In the example shown, the Nielsen Audio Survey is selected, as well as an audience (in this case, Women 18-44). The survey and audience indicate a population of 56,642,000 for determining GRP and/or the value of impressions. Targeting allows the RFP configuration 602 to include high-level specifications about what types of stations 210 to include and exclude based on factors including region, market, format, and controversial versus not. This eliminates a normally tedious and error prone process where stations may be individually picked. It also allows the RFP to be re-planned to adapt to additions of stations or changes of existing stations. For example the station's format might change from talk radio to contemporary music. Content separation allows an RFP to indicate which other advertisers may not be placed next to this RFP. For example, two competing soda companies will typically not want to be advertised back-to-back next to each other.

Goals UI element 806 details a campaign's goals, allowing several options and combinations of options. Typically, either a budget goal or an impressions goal is given. When only a budget goal is given, planning 702 proceeds until the plan's cost is just under or at the budget goal. Planning 702 may stop earlier than this if compatible inventory is exhausted. Similarly, when only an impressions goal is given, planning 702 proceeds until the plan is at or just above that goal. Another common goal setup is to give only a cost per unit, either as cost per point (CPP) or cost per mill (CPM), where mill means 1000 impressions. When given only a cost per unit limit, planning 702 forms the plan such that the cost per unit of the plan is kept at or below the limit. However, it is optional whether planning 702 will attempt to use the cost per unit as an "attractor", picking inventory to try to drive the plan up to that cost per unit. Planning 702 is designed to behave reasonably when given no goals at all, or any combination of multiple goals. Typically, an ad agency commission percentage is given. This proactively adjusts the price of a plan up to account for the commission an agency will take from the budget given by the advertiser 202. Goals may be set for the overall RFP, or they may be "split", allowing independent goals to be given for each configuration/target of the RFP 808.

Configurations UI element 808 details indicates the time period or periods that the campaign may be delivered in. In the example shown there are two configurations, named "amd" for AM Drive and "pmd" for PM Drive. Each configuration indicates the daypart in the week it would like to target as well as an independent set of week it would like to be active in. While the ads themselves do not need to be specified when the RFP is entered, the duration of the ads may so that planning 702 knows how much space will be needed for each placement of the RFP. Finally, "consider alternative AQH ratings" can be used to optimize/customize the AQHs (average quarter-hour persons) calculated on a station by station basis when the station 210's inventory does not fully cover the RFP daypart. Normally, AQH is measured as the average within the RFP daypart. However, if a station has no inventory in part of the RFP daypart, a second average is calculated based on just the portion of the RFP daypart that is covered by the station 210's inventory. The larger of the two AQH measures is selected as the active measure for that station.

A plan resulting from an RFP configuration 602 can be replanned. All aspects of targeting and sizing can be changed in the RFP UI when setting up the replan. Additionally, the Planner Configuration UI element 820 allows the selection of one of four modes governing how the new plan will be formed versus the old plan. These are called anchoring modes. The most permissive is "New Revision", where the new plan is formed independently from the parent plan. The most restrictive is "Anchored revision restricted to original placements.", which only allows the new plan to use the same stations 210 that were used in the old plan. Additionally, the new plan may only place up to as many placements in each station 210 as the old parent plan had. The descriptions in FIG. 8C describe more about each anchoring mode.

As a plurality of specifications/plans are created, a Spot Plans UI element 840 shows an example of a review of all a user's plans. In the example shown, each plan is shown along with the date of creation, a start date of a plan, an end date of a plan, a duration, the planner's identity, a name of the plan, an ad agency associated with the plan, an advertiser associated with the plan, a plan budget goal, a plan GRPs goal, a plan CPP goal, a plan G Imps goal, a plan CPM goal, any adjustments made, a state (saved, proposed, reserved, booked), and a health metric. A Details UI element 860 allows the user to "double-click" on a row to give more detailed information and/or updated feedback for a given RFP plan.

Three core algorithms for planning. In one embodiment, the planning process consists of several cooperating algorithms which perform systematic, exhaustive, and deep processing. It is only via this automated processing that one could solve the problem at hand. The following describes three core algorithms of the overall process in one embodiment.

The placement algorithm. In one embodiment, when planning a campaign, each placement is created one at a time, in part by using a placement algorithm and/or technique. This allows the technique to adjust each placement according to the distribution and other metrics of the plan so far. When deciding whether a piece of inventory can accept a placement for a campaign, it is first checked if the inventory has a break with enough remaining space to hold a placement from the campaign. Additionally, the break with an opening may not already contain pre-existing placements that would conflict with the campaign. If the inventory has a break with an opening and no conflict, it becomes a candidate for where the next placement is put. The fitness of each bit of inventory is then measured, and the one with the highest fitness is picked.

The fitness may in one embodiment be a combination of many industry-specific metrics such as financial margins, campaign budget and rate constraints, demographics matchup, changes in listenership numbers in different weeks, days, and parts of the day, the plan's distribution so far amongst markets and stations, its distribution within markets and stations, the relative weight of highly-attractive stations versus normal stations, the impact on how well balanced the network's remaining inventory is, and other factors that affect the attractiveness of the remaining inventory to future advertisers and the campaigns they might try to plan into the remaining network inventory. Additionally, in one embodiment a "weak" distribution force is added into the process to encourage plans to form into as many stations and inventories as possible. In one embodiment, fitness is primarily based on the match between the demographic asked for in the RFP and the percentage of an inventory's listenership that matches that demographic. This is termed demographic matchup, or just "demomatch". In addition to measuring the fitness of each choice, many of these metrics also have the power to veto the placement of an ad into a particular spot if the value calculated for the spot is outside the allowed boundaries for that metric. Thus, each metric sets boundaries but also encourages the best inventories from amonst the ones that are within those boundaries.

Figure 9:
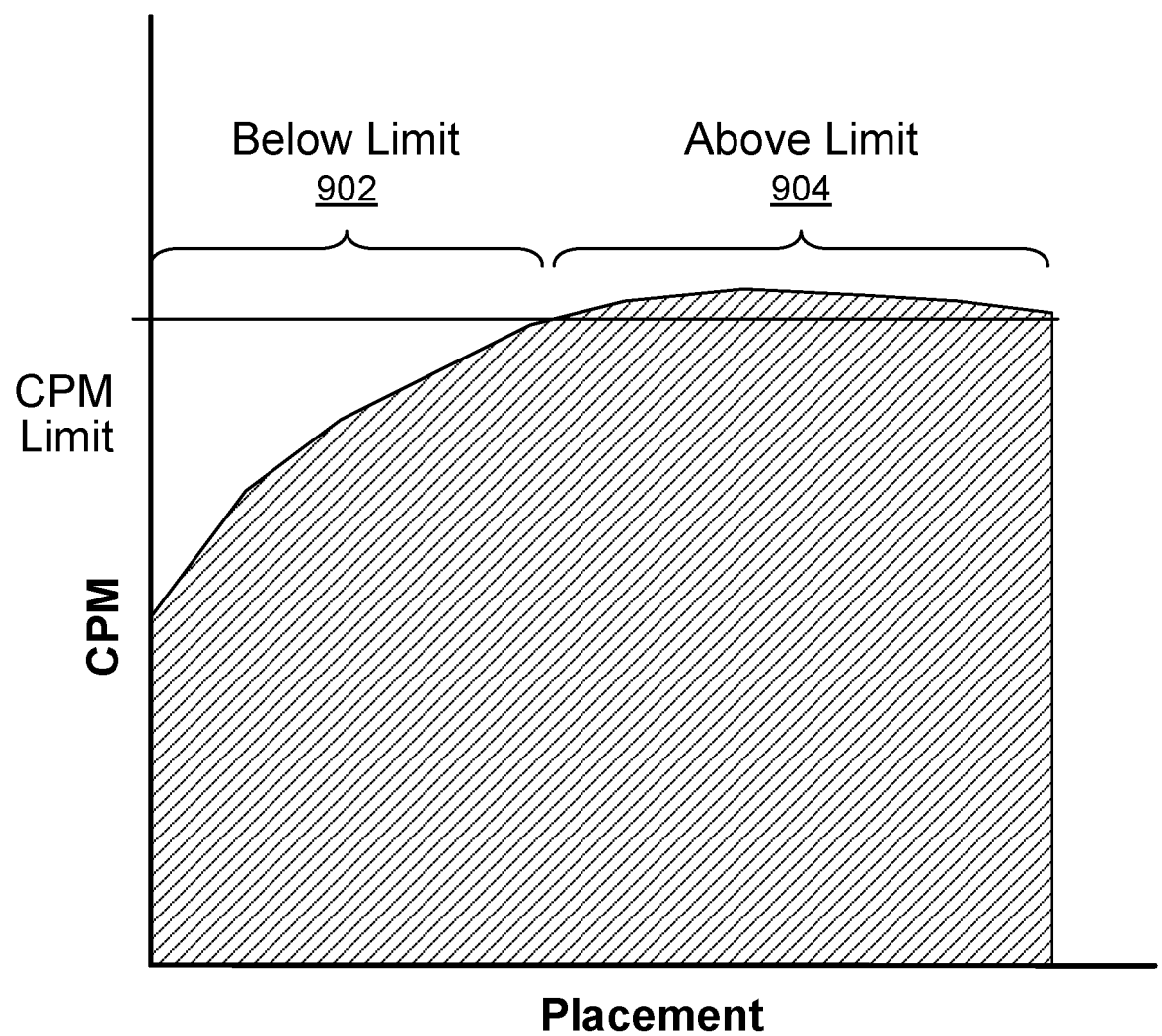
FIG. 9 is an illustration of the bank-account style credit principle.

FIG. 9 is an illustration of the bank-account style credit principle. In one embodiment, an important improvement regarding vetoes is the handling of CPM. An advertiser has the option of specifying a maximum CPM limit, or equivalently, a CPP limit, they wish to pay. A naive strategy to support this might be to ensure that every placement picked does not exceed the maximum CPM limit, thus making it clearly certain that the overall plan will not exceed the CPM limit. The problem with this strategy is that the resulting plan is typically substantially below the CPM limit.

With automation, a more sophisticated strategy may be used using the bank-account style credit principle that increases value for an advertiser. When a CPM is set, the placement algorithm respects this by tracking the overall CPM of the plan in progress. If a new placement in a particular position would take the overall plan over the CPM limit, then the CPM metric vetoes the move. However, as other placements are picked that keep the overall plan below the CPM limit shown as 902 in FIG. 9, a buffer or "bank-account credit" is built up that may allow the campaign plan to come back to a placement that was over the CPM limit shown as 904 in FIG. 9, and approve/encourage it later on.

The transfer algorithm. In one embodiment, when there is no suitable space left in a piece of inventory for a campaign placement, a transfer algorithm and/or technique checks whether suitable space can be made by transferring existing campaign placements somewhere else. For each placement transferred out, and each destination potentially suitable to transfer to, the impact on fitness, or fitness delta, is measured. The transfer which maintains the highest overall fitness level is picked. In one embodiment, the fitness deltas can be weighted according to priorities set for each ad agency, and/or for certain combinations of advertisers/ad agencies, as prioritized by the network or ad agency.

In one embodiment, as inventory becomes more full, there may be no direct openings to transfer to. In that case, a form of recursion may be used to perform an iteratively deepening search to see if there exists a chain of transfers of pre-existing placement from other plans, called a "cascade", which will produce an opening in the inventory in question. Such a cascade will transfer to an opening in some other inventory in order to produce an opening in the inventory in question. In one embodiment, to optimize this process, a customized form of iterative deepening is applied: a first search is made for any depth-1 solutions, then a second search for any depth-2 solutions, and so forth. The customization comes from that fact that a graph is not simply traversed; customization is needed to deal with a graph of inventories, each of which contains a subgraph of breaks and spots inside it. In effect, the algorithm may deal with a hierarchical or multi-level graph. Moreover, each placement the algorithm considers moving may deal with complex constraints from the RFP as to where it may validly be transferred.

As an example, consider the following table showing potential plan/campaign placements in four breaks. Each placement takes 30 s while each break lasts 60s:

|  | Break I | Break II | Break III | Break IV |
| --- | --- | --- | --- | --- |
| 1$^{st}$ 30 sec | A | A | B | D |
| 2$^{nd}$ 30 sec |  |  | C |  |

Now suppose it is wanted to add another placement from A into one of the break. However, there are several campaign-separation rules to consider. First, a campaign may not be placed in the same break more than once. Also, due to advertiser content, A may not be placed with C or D. So, while there are three openings that would fit A, A may not be placed in any of them. However, a transfer can be performed to solve the situation:

Step 1: Transfer C from Break III/$2^{nd}$ 30 sec to Break IV/$2^{nd}$ 30 sec.

|  | Break I | Break II | Break III | Break IV |
|---|---|---|---|---|
| $1^{st}$ 30 sec | A | A | B | D |
| $2^{nd}$ 30 sec |  |  |  | C |

Step 2: Add A to Break III/$2^{nd}$ 30 sec.

|  | Break I | Break II | Break III | Break IV |
|---|---|---|---|---|
| $1^{st}$ 30 sec | A | A | B | D |
| $2^{nd}$ 30 sec |  |  | A | C |

In one embodiment, to increase the efficiency of searching for transfer strategies, each placement is stored with a high-level description of which other inventories it can be transferred to without doing a sophisticated analysis. These are inventories where the placement ends up having the same impressions. The impressions a placement garners is calculated based on the campaign daypart, which typically covers multiple inventories. It is industry practice to measure impressions based on the campaign daypart rather than the specific impressions within a particular inventory that the campaign daypart covers. Because of this, a placement may be free to transfer to any inventory that is covered by the campaign daypart, since it may, by definition, end up with the same averaged impressions count within that region.

In one embodiment, non-generic algorithms customized to the domain and the multi-level graph nature of the data may be used. For example, as with any graph-traversal algorithm, care may be taken to not end up in a cycle where one visits the same node twice in the same line of searching. However, with a multi-level graph, the definition of a "node" is really a combination of an inventory, break, and a campaign. Another customization is that in some cases it is needed to move multiple placements out of a break in order to make space for a single incoming placement. For example, one might consider transferring two 30-second placements out of an inventory in order to transfer one 60-second placement in. This is discussed more below.

In one embodiment, another step of the transfer technique that is a key improvement is a "no-middlemen rule", where a transfer sequence like "X→Y→Z→Y→opening" is simplified to "X→Y→opening". That is, it is detected that the first, second, and third move Y→Z→Y produces equivalent results to simply the first move. This rule is affected by not considering transfers into inventory that the previously transferred placement in the transfer sequence could have moved directly to anyway.

In one embodiment, another key advancement recognizes that multiple ads can fit into a single break. For example, a two-minute break may contain four thirty-second ads. If it is wanted to create an opening in that break for a new sixty-second ad, two of the ads already in the break may be picked and simultaneously moved out. To do this properly, the algorithm does not just stop once two ads are found that can be moved, nor does the technique settle for picking the two transfers which, in isolation, have the best fitness. Instead, the combination of two transfers with the highest fitness is picked, partially to ensure transfers do not conflict with each other. For example, a naive approach might have tried to transfer both ads into the same opening.

The tiling algorithm. Part of managing network inventory is to make sure that within a station, the placements from all the campaigns are well distributed and well rotated. In one embodiment, a tiling algorithm and/or technique is used to accomplish this. Given, for example, an inventory with eight 30-second breaks, and it is wanted to place 3 instances of campaign A, 3 of campaign B, and 2 of campaign C. A naive approach would be to simply place the ads in order: AAABBBCC.

However, this has very poor rotation of the ads, and it fails to distribute each campaign across the entire inventory. Intuitively, it seems clear that a better mix, also stated throughout this specification as "tiling", of the placements is "ABCABCAB", which maximizes both the spread of each campaign (improved reach/impact to listeners over time) and the rotation amongst the campaigns (better listener experience).

Humans produce good rotations intuitively and holistically, looking at the entire distribution at once. The disclosed technique produces a similar result while using a process that is very different from how people might produce the result. In one embodiment, the tiling algorithm places things from left to right and does not need to know the total number of spots. For each pick made, the technique calculates a progress metric for each campaign. The progress metric is determined to be the number of plays of the campaign, plus 1, divided by the total number of desired plays. In the example above, initially:

$$\text{Progress}(A)=(\text{plays}+1)/\text{desiredPlays}=(0+1)/3=0.33$$

$$\text{Progress}(B)=(0+1)/3=0.33$$

$$\text{Progress}(C)=(0+1)/2=0.5$$

The algorithm then picks from among the campaigns that may have the lowest progress if they are picked, campaign A and B. To deal with tie-breakers, the least-recently picked campaign is selected. If the tied campaigns have not been picked yet, the technique picks in some consistent way, such as alphabetically. This is done so that the algorithm is deterministic or "stable" and does not produce a trivially different result each time it is run.

Thus, having picked A, the algorithm then runs the same process again to pick the next campaign:

$$\text{Progress}(A)=(1+1)/3=0.67$$

Progress(B) remains 0.33

Progress(C) remains 0.5

The campaign that is furthest behind is now B, so it is picked. The sequence is now "AB . . . ". The new progresses are A=0.67, B=0.67, and C=0.5, so C is picked next, and the sequence becomes "ABC . . . ". The progresses are now A=0.67, B=0.67, C=1. There is now a tie between picking A and B again, but applying the least-recently-picked rule, A is selected and the sequence becomes "ABCA . . . ". The process continues until all campaigns have been picked as many times as wanted.

In one embodiment, tiling works equally well for multi-ad breaks. For example, a piece of inventory with six 60-second breaks exists and the following campaigns are to be fitted into it: 6 As, 3 Bs, and 3 Cs. Each campaign has 30-second ads. The only real solution is: "AB, AC, AB, AC, AB, AC". The challenge of this situation is that if the algorithm mistakenly pairs B with C at any point, then it will not be able to complete the As since it is not allowed to place two As in the same break. The tiling algorithm method resolves this with little failure; any combination of campaign placements that has a solution may be solved by the tiling algorithm disclosed.

Figure 10:
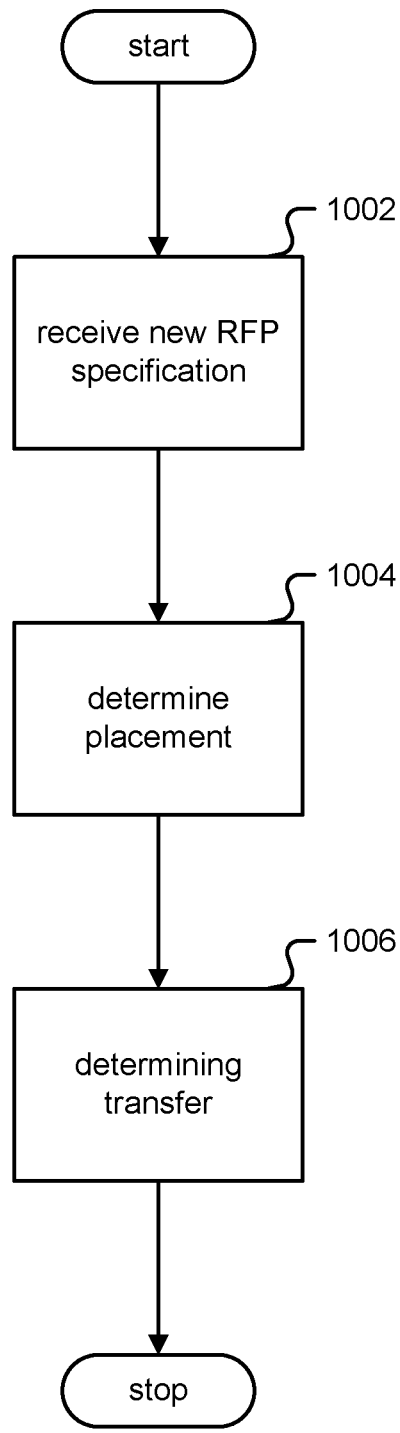
FIG. 10 is a series of steps of an embodiment for planning broadcast ads.

Summary. FIG. 10 is a series of steps of an embodiment for planning broadcast ads. In one embodiment the steps in FIG. 10 may be performed by systems in FIG. 6 including one or more of the following: the planner system 606, ad rotation configuration system 608 and ad scheduler 610. In one embodiment, broadcast is associated with one or more of the following: radio broadcast, television broadcast, and print broadcast.

At step 1002, a new RFP specification for a new broadcast ad campaign is received. Each RFP specification may include various targeting such as station types, weeks, and demographics. Also, each RFP specification may include various sizing goals such as impressions, budget, or impressions per cost rates. At step 1004, a placement is determined for a new broadcast ad in a suitable position within an ad network inventory based at least in part on the new RFP specification. In one embodiment, the determination of placement to the suitable position is based at least in part on the new RFP specification. In one embodiment, the new broadcast ad campaign includes the new broadcast ad. In one embodiment, the ad network inventory includes station inventory for each station in an ad network.

In one embodiment, the determination of placement to the suitable position is based at least in part on a fitness metric, wherein the fitness metric is based on one or more of the following: a measure of demographic match, a measure of market balance, and a measure of weak balance.

At step 1006, a transfer is determined of an existing placement for an existing plan out of one suitable position to a newer position based at least in part on the existing RFP specification of the plan. In one embodiment, the existing placement is part of an existing broadcast ad campaign. In one embodiment, the determination of transfer from the suitable position to the newer position is based at least in part on an existing RFP specification. In one embodiment, the existing RFP specification was received for the existing broadcast ad campaign. In one embodiment, the determination of transfer is based on one or more of the following: a cycle elimination rule and a no-middlemen rule.

In one embodiment, a step (not shown in FIG. 10) includes transferring the existing placement to the new position, or placing the new placement in the suitable position. In one embodiment, a step (not shown in FIG. 10) includes normalizing each requirement within the RFP specification to a financial metric.

In one embodiment, the determination of placement to the suitable position is based at least in part on whether the placement does not exceed a financial budget for the new RFP specification. In one embodiment, the financial budget is aggregated over every placement in the new broadcast ad campaign as a bank-account style credit.

In one embodiment, an adaptation of the placement or the transfer responds to a change in the ad network inventory. A change in the ad network inventory includes inventory being damaged based at least in part on removal of a station. A change in the ad network inventory may also include a change in a station's format or demographics.

Figure 11:
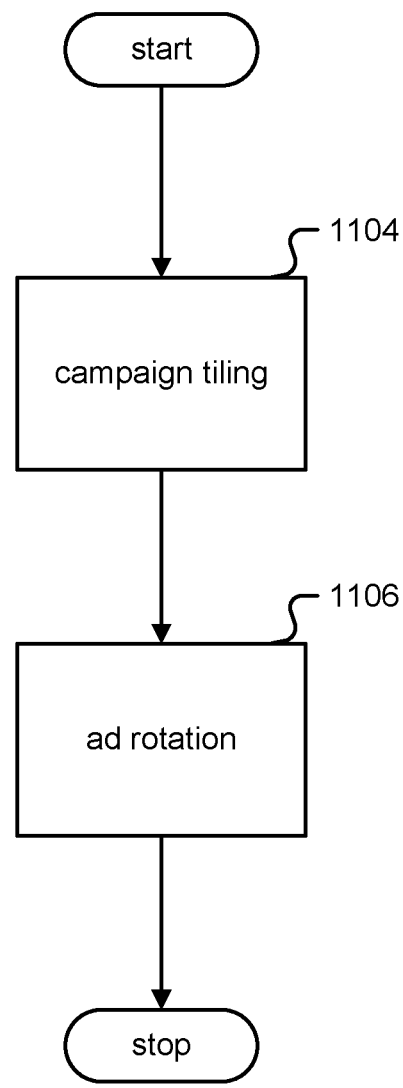
FIG. 11 is a series of steps of an embodiment for tiling broadcast ads.

FIG. 11 is a series of steps of an embodiment for tiling broadcast ads. In one embodiment the steps in FIG. 11 may be performed by systems in FIG. 6 including one or more of the following: the planner system 606, ad rotation configuration system 608 and ad scheduler 610. The steps of FIG. 11 may succeed the steps of FIG. 10. In some embodiments either step 1104 or step 1106 or both may be skipped.

At step 1104 campaign tiling amongst campaigns already placed in inventory occurs. This step includes the techniques described in the tiling algorithm above. At step 1106 ad rotation of creative from within the new broadcast ad campaign occurs.

Conclusion. Being able to adaptively transfer allocations as new campaigns are planned allows an ad network to sell optimistically. By contrast, without the ability to adjust and rebalance campaign plans as things develop, an ad network is forced to sell conservatively; the ad network may decide to sell or not based on predictions of how much remaining demand there is for the item. These predictions are expensive to produce, are inaccurate, and even if they were "perfectly accurate", what actually happens each week may varies around the predicted result. Where demand was lower than predicted, that inventory is not fully filled or is sold for less than it could have been. Where demand was higher than predicted, that inventory is filled, but for less price than it could have been. Handling things adaptively rather than predictively allows a network to fill their inventory optimally given the amount of demand that has developed so far.

To fully fill inventory in a way that customizes campaign plans to where they are most effective takes a computer. The computer may use graph algorithms, depth searching, and the capacity to make hundreds of thousands of adjustments quickly. The reward to the ad network is a high fill rate with highly optimized placements that would not have been possible before. In an industry where an ad network might run on perhaps a 10% margin, the significance of finally being able to fill the last 20% of ad inventory, and using far less overhead to do so, makes an impact on the financials of the company. As a toy example, suppose a network previously brought in 10 units of money for 9 units cost: a 10% margin. Assume that the 9 units cost consists of 7 units paid to stations for their inventory, and 2 units for personnel to run the network's pen-and-paper process. Using the disclosed techniques, the network would bring in 12.5 units and cost would be reduced to 7 units. This translates into about a sizeable 45% margin.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method of planning broadcast ads, comprising:
receiving a new Request For Proposal ("RFP") specification for a new broadcast ad campaign to be played on a real-time media-delivery appliance;
wherein the real-time media-delivery appliance comprises a capability to directly push content to terrestrial radio broadcast after detecting and decoding an in-band trigger from directly monitoring output of a terrestrial radio broadcast mixer;
determining a placement for a new broadcast ad to be played on the real-time media-delivery appliance, in a suitable position within an ad network inventory based at least in part on the new RFP specification; and determining a transfer of an existing placement for an existing broadcast ad campaign out of the suitable position to a newer position based at least in part on an existing RFP specification.

2. The method recited in claim 1, wherein:
the determination of placement to the suitable position is based at least in part on the new RFP specification;
the new broadcast ad campaign includes the new broadcast ad; and
the ad network inventory includes station inventory for each station in an ad network.

3. The method recited in claim 1, wherein:
the existing broadcast ad is part of an existing broadcast ad campaign;
the determination of transfer from the suitable position to the newer position is based at least in part on an existing RFP specification; and
the existing RFP specification was received for the existing broadcast ad campaign.

4. The method recited in claim 1, further comprising one or more of the following:
transferring the existing broadcast ad to the new position; and
placing the new broadcast ad in the suitable position.

5. The method recited in claim 1, further comprising normalizing each requirement within the RFP specification to a financial metric.

6. The method recited in claim 1, wherein the determination of placement to the suitable position is based at least in part on whether placement of the new broadcast ad does not exceed a financial budget for the new RFP specification.

7. The method recited in claim 6, wherein the financial budget is aggregated over every broadcast ad in the new broadcast ad campaign as a bank-account style credit.

8. The method recited in claim 1, further comprising determining a tiling pattern for the new broadcast ad.

9. The method recited in claim 8, further comprising tiling the new broadcast ad.

10. The method recited in claim 8, wherein the tiling pattern comprises ad rotation amongst campaigns already placed in inventory.

11. The method recited in claim 8, wherein the tiling pattern comprises ad selection of creative from within the new broadcast ad campaign.

12. The method recited in claim 1, wherein each RFP specification includes a target demographic, a target market, and a budget.

13. The method recited in claim 1, further comprising determining an adaptation of the placement or the transfer to respond to a change in the ad network inventory.

14. The method recited in claim 13, wherein the change in the ad network inventory includes inventory being damaged based at least in part on removal of a station.

15. The method recited in claim 13, wherein the change in the ad network inventory includes a change in a station format or demographics.

16. The method recited in claim 1, wherein the determination of placement to the suitable position is based at least in part on a fitness metric, wherein the fitness metric is based on one or more of the following: a measure of demographic match, a measure of market balance, and a measure of weak balance.

17. The method recited in claim 1, wherein the determination of transfer is based on one or more of the following: a cycle elimination rule and a no-middlemen rule.

18. The method recited in claim 1, wherein broadcast is associated with one or more of the following: radio broadcast, television broadcast, and print broadcast.

19. A real-time media-delivery appliance, comprising:
a direct interface for a terrestrial radio broadcast mixer input;
an in-band interface for a terrestrial radio broadcast mixer output;
a processor coupled to the direct interface and the in-band interface and configured to:
receive a new RFP specification for a new broadcast ad campaign to be played on the real-time media-delivery appliance;
provide a capability to directly push content to terrestrial radio broadcast via the direct interface after detecting and decoding an in-band trigger from monitoring the in-band interface;
determine a placement for a new broadcast ad to be played on the real-time media-delivery appliance, in a suitable position within an ad network inventory based at least in part on the new RFP specification; and
determine a transfer of an existing placement for an existing broadcast ad campaign out of the suitable position to a newer position based at least in part on an existing RFP specification; and
a memory coupled to the processor and configured to provide the processor with instructions.

20. A computer program product for planning broadcast ads, the computer program product being embodied in a non-transitory computer readable storage medium and comprising computer instructions for:
receiving a new RFP specification for a new broadcast ad campaign to be played on a real-time media-delivery appliance;
wherein the real-time media-delivery appliance comprises a capability to directly push content to terrestrial radio broadcast after detecting and decoding an in-band trigger from directly monitoring output of a terrestrial radio broadcast mixer;
determining a placement for a new broadcast ad to be played on the real-time media-delivery appliance, in a suitable position within an ad network inventory based at least in part on the new RFP specification; and
determining a transfer of an existing placement for an existing broadcast ad campaign out of the suitable position to a newer position based at least in part on an existing RFP specification.

* * * * *

UNITED STATES PATENT AND TRADEMARK OFFICE
CERTIFICATE OF CORRECTION

PATENT NO. : 11,200,603 B2
APPLICATION NO. : 16/904958
DATED : December 14, 2021
INVENTOR(S) : John Paul LeFlohic, Torsten Schulz and Trevor Price It is certified that error appears in the above-identified patent and that said Letters Patent is hereby corrected as shown below:

In the Specification

In Column 7, Line(s) 38, delete "the the" and insert --the--, therefor.

Signed and Sealed this
Eighteenth Day of October, 2022

Katherine Kelly Vidal
*Director of the United States Patent and Trademark Office*